(12) United States Patent
Makishima

(10) Patent No.: US 6,906,818 B1
(45) Date of Patent: Jun. 14, 2005

(54) DATA COMMUNICATION SYSTEM

(75) Inventor: Sugio Makishima, Tokyo (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 1037 days.

(21) Appl. No.: 09/612,094

(22) Filed: Jul. 7, 2000

(30) Foreign Application Priority Data

Jul. 9, 1999 (JP) ............................................ 11-195433

(51) Int. Cl.[7] .......................... G06F 15/00; H04N 5/225; H04N 9/04; H04B 7/00; H04M 3/00
(52) U.S. Cl. .............. 358/1.15; 348/207.1; 348/207.11; 348/207.99; 455/41.3; 455/420
(58) Field of Search ................................ 358/1.15, 302, 358/400; 348/207.11, 207.1, 211.2, 211.3, 231.2, 211.99, 426.1, 14.02, 552, 569; 709/203, 205; 455/420, 41.3, 333.01, 333.02, 556, 557, 566, 66

(56) References Cited

U.S. PATENT DOCUMENTS 6,392,697 B1 * 5/2002 Tanaka et al. ........... 348/220.1

* cited by examiner

Primary Examiner—Kimberly Williams
Assistant Examiner—Thomas Lett
(74) Attorney, Agent, or Firm—Birch, Stewart, Kolasch & Birch LLP

(57) ABSTRACT

A data communication system is so adapted that even if E-mail received by a mobile telephone has an image file attached thereto, the image represented by the image file can be displayed. An E-mail file is received by a mobile telephone and text represented by text data contained in the file is displayed on the display screen of the mobile telephone. When a received E-mail file has an image file attachment, the portable telephone interrogates a digital still camera as to whether the camera is capable of displaying the image contained in this image file. When the camera is capable of displaying the image, the image file is transmitted to the camera. The image represented by the image file is then displayed on the display screen of the camera.

7 Claims, 9 Drawing Sheets

DATA COMMUNICATION SYSTEM

BACKGROUND OF THE INVENTION

1. Field of the Invention

This invention relates to a data communication system in which a digital camera and a portable communication apparatus are capable of communicating data with each other and the portable communication apparatus is capable of data communication via a network. The invention relates further to the digital camera, the portable communication apparatus and a method of controlling the operation of the portable communication apparatus.

2. Description of the Related Art

In data communication systems which are being proposed, a digital camera and a portable communication apparatus such as a mobile telephone are capable of data communication with each other and image data representing an image obtained by photography using the digital camera is transmitted from the portable communication apparatus via a network. Alternatively, image data that has been transmitted via the network is received using the portable communication apparatus and the image is displayed on a display unit with which the digital camera is provided.

However, image data alone is seldom sent and received. It is far more common for both image data and text data to be sent and received together.

In general, however, a digital camera does not contain software for displaying text. In addition, often font data for displaying text also is not stored in a digital camera. For these reasons, text often cannot be displayed on the display unit of a digital camera.

Adapting a portable communication apparatus or digital camera so as to be capable of displaying both images and text results in higher cost.

SUMMARY OF THE INVENTION

Accordingly, an object of the present invention is to make it possible to display both images and text, without an increase in cost, when image data and text data has been transmitted.

A data communication system in accordance with the present invention is such that a digital camera and a portable communication apparatus are capable of communicating data with each other and the portable communication apparatus is capable of communicating with another communication apparatus via a network.

The portable communication apparatus has a first receiving unit (first receiving means) for receiving data transmitted via a network; a text display unit for displaying text represented by text data contained in data received by the first receiving unit; a first determination unit (first determination means) for determining whether data received by the first receiving unit contains image data representing an image; and an image transmitting unit (image transmitting means), which is responsive to a determination that the received data contains image data, for transmitting the image data contained in the received data to the digital camera.

The digital camera has a second receiving unit (second receiving means) for receiving image data transmitted from the image transmitting means of the portable communication apparatus, and an image display unit for displaying an image represented by image data received by the second receiving unit.

The present invention provides also a method of controlling the operation of the portable communication apparatus constructing the above-described system. Specifically, the invention provides a method of controlling operation of a portable communication apparatus capable of communicating data with a digital camera and of communicating with another communication apparatus via a network, comprising the steps of: receiving data transmitted via the network; displaying text, which is represented by text data contained in the received data, on a text display unit; determining whether the received data contains image data representing an image; and in response to a determination that the received data contains image data, transmitting the image data contained in the received data to the digital camera.

Thus, in accordance with the present invention, data transmitted via a network is received by the portable communication apparatus. If the received data contains text data, the text represented by this text data is displayed on the text display unit of the portable communication apparatus.

If the received data contains image data, this image data is transmitted from the portable communication apparatus to the digital camera.

When the digital camera receives image data transmitted from the portable communication apparatus, the image represented by this image data is displayed on the image display unit of the digital camera.

Thus, even if data transmitted via the network contains text data and image data, the text represented by the text data can be displayed and the image represented by the image data can be displayed. Moreover, the display unit of the digital camera or portable communication apparatus need not necessarily be capable of displaying both text and images. This means an increase in equipment cost can be avoided.

The portable communication apparatus further includes a type-data transmitting unit (type-data transmitting means) for transmitting type data, which represents the type of image data contained in the image data, to the digital camera. The digital camera may be provided with a second determination unit (second determination means) for determining whether an image represented by the image data can be displayed on the display unit based upon the type data transmitted from the portable communication apparatus.

Depending upon the type of image data, there are images that cannot be displayed on a digital camera. The portable communication apparatus determines whether an image represented by received image data is incapable of being displayed on the display unit of the digital camera. When an image cannot be displayed on the display unit of the digital camera, transmission from the portable communication apparatus to the digital camera can be halted.

The digital camera may further have a determination-result transmitting unit (determination-result transmitting means) for transmitting data representing result of the determination by the second determination unit to the portable communication apparatus. In this case, the image transmitting unit of the portable communication apparatus would respond to an indication by determination-result data transmitted from the determination-result transmitting unit that the image represented by the image data can be displayed on the image display unit by transmitting this image data to the digital camera.

The portable communication apparatus may further have a transmit-command input unit (transmit-command input means) for inputting an image-transmit command. In this case the image transmitting unit would transmit image data to the digital camera in response to input of the transmit command from the transmit-command input unit.

Thus, by inputting the image-transmit command as necessary, only the necessary image data can be transmitted from the portable communication apparatus to the digital camera.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described with reference to the drawings.

Figure 1:
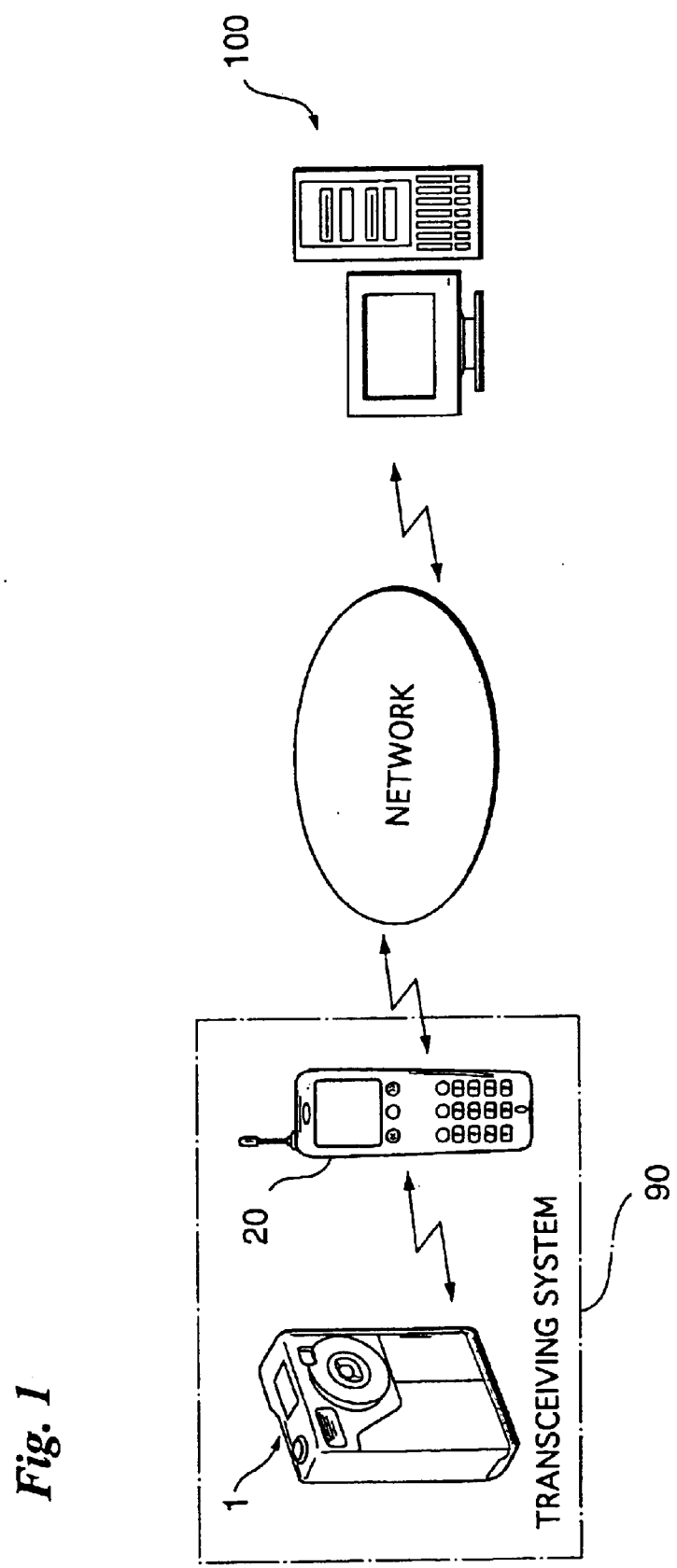
FIG. 1 is a diagram showing an overview of a data communication system according to a preferred embodiment of the present invention.

FIG. 1 is a diagram showing an overview of a data communication system according to a preferred embodiment of the present invention.

The data communication system comprises a transceiving system 90 and a server 100 capable of communicating data with each other via a network.

In this embodiment, the transceiving system 90 is capable of sending and receiving data but may be exclusively for receiving data.

The transceiving system 90 is constituted by a digital still camera 1 and a mobile telephone 20 capable of communicating data with each other. The digital still camera 1 and the mobile telephone 20 that are to mutually communicate with each other may be determined in advance. In this embodiment, the digital still camera 1 and mobile telephone 20 communicate wirelessly but may communicate by wire.

The server 100 includes a controller such as a CPU, a memory for storing data temporarily, a modem for connecting to a network and a monitor display unit.

Figure 2:
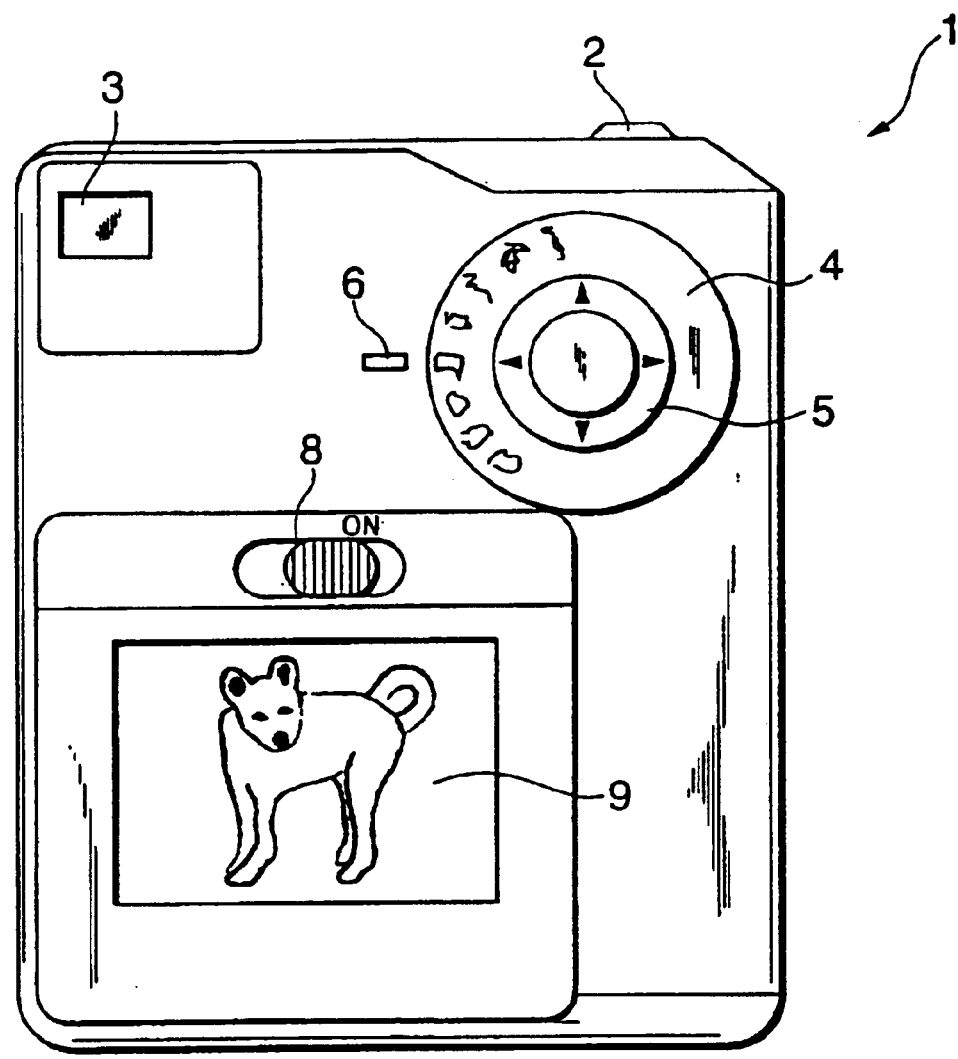
FIG. 2 is a back view of a digital still camera according to this embodiment.

FIG. 2 is a back view of the digital still camera 1.

Formed on the right side of an optical viewfinder 3 in freely rotatable fashion is a mode setting dial 4 bearing pictures representing various modes. An index mark 6 is formed on the left side of the mode setting dial 4. The mode setting dial 4 is turned by the user in such a manner that the picture representing the desired mode will be positioned at the index mark 6. The modes include an imaging mode for imaging a subject, a playback mode for displaying an image represented by image data that has been recorded on a memory card, and a standby mode used when waiting for a transmission from the mobile telephone 20.

An up, down, left, right button 5 on which up, down, left and right arrows have been formed is provided on the inner side of the mode setting dial 4.

A liquid crystal display device 9 is provided on the back of the digital still camera 1 on the lower side thereof and, as will be described later, is capable of displaying an image represented by image data transmitted from the mobile telephone 20, an image represented by image data that has been recorded on a memory card, and an image of a subject obtained by imaging. A power switch 8 is provided above the liquid crystal display device 9.

A shutter-release button 2 is formed on the top side of the digital still camera 1.

Figure 3:
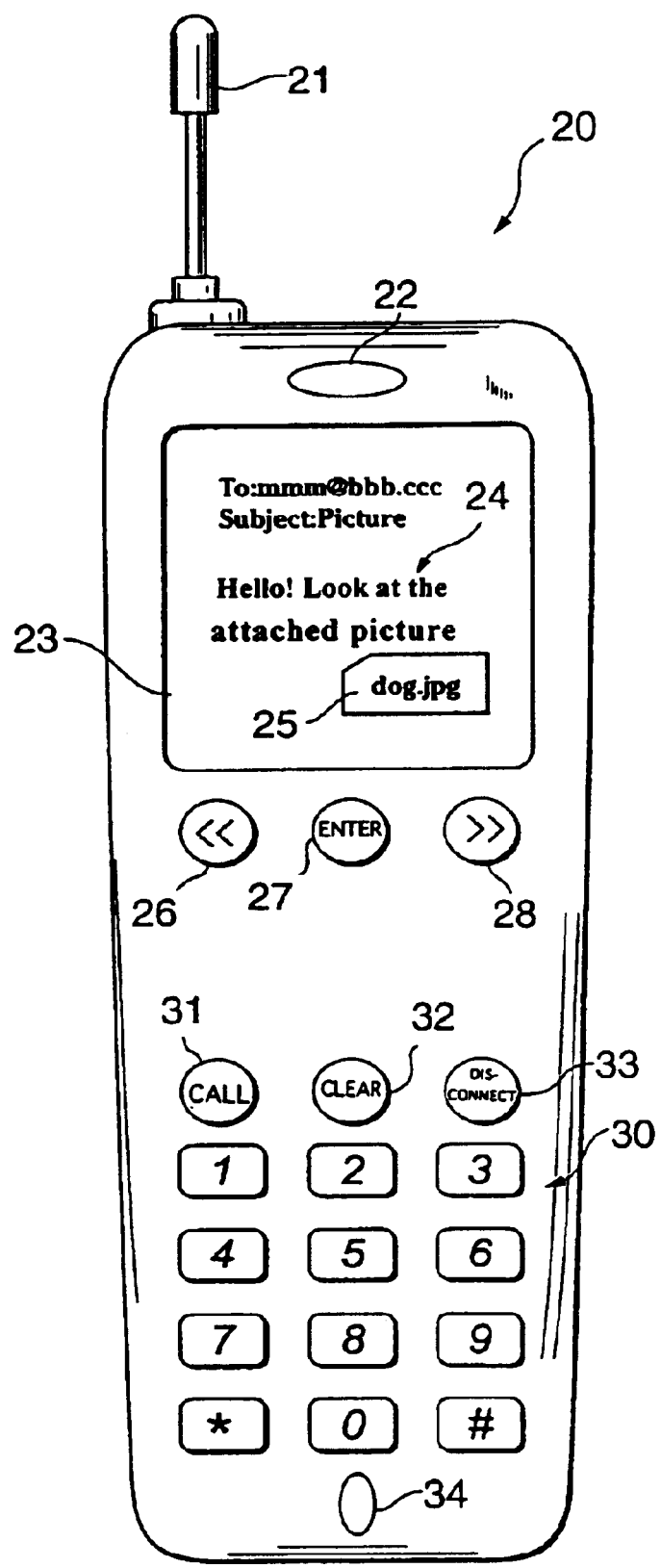
FIG. 3 is a front view of a mobile telephone according to this embodiment.

FIG. 3 illustrates the external appearance of the mobile telephone 20 as seen from its front side.

The upper part of the mobile telephone 20 is formed to have an antenna 21 for communicating with the server 100 and other mobile telephones and the like via a network.

A speaker 22 for outputting voice is provided on the front side of the mobile telephone 20 at the upper portion thereof.

Formed below the speaker 22 is a liquid crystal display screen 23 which includes an area 24 for displaying text and an area 25 for displaying the fact that there is an image represented by image data that has been received by the mobile telephone 20. The area 25 displays an image file name (e.g., dog.jpg).

Provided below the liquid crystal display screen 23 are a left-arrow button 26, an ENTER button 27 and a right-arrow button 28. These buttons 26, 27 and 28 are used to specify an image file name being displayed in the area 25 of liquid crystal display screen 23. If the image data received by the mobile telephone 20 represents a plurality of frames, the left-arrow button 26 is pressed when the file name of the image of the preceding frame is to be displayed in the area 25. The right-arrow button 28 is pressed when the file name of image of the succeeding frame is to be displayed in the area 25. When image data of a file name being displayed in the area 25 is transmitted to the digital still camera 1 from the mobile telephone 20, the user presses the ENTER button 27.

A call button 31, a clear button 32 and a disconnect button 33 are formed below the buttons 26, 27 and 28. Numeric keys 30 are formed below the buttons 31, 32 and 33.

Figure 4:
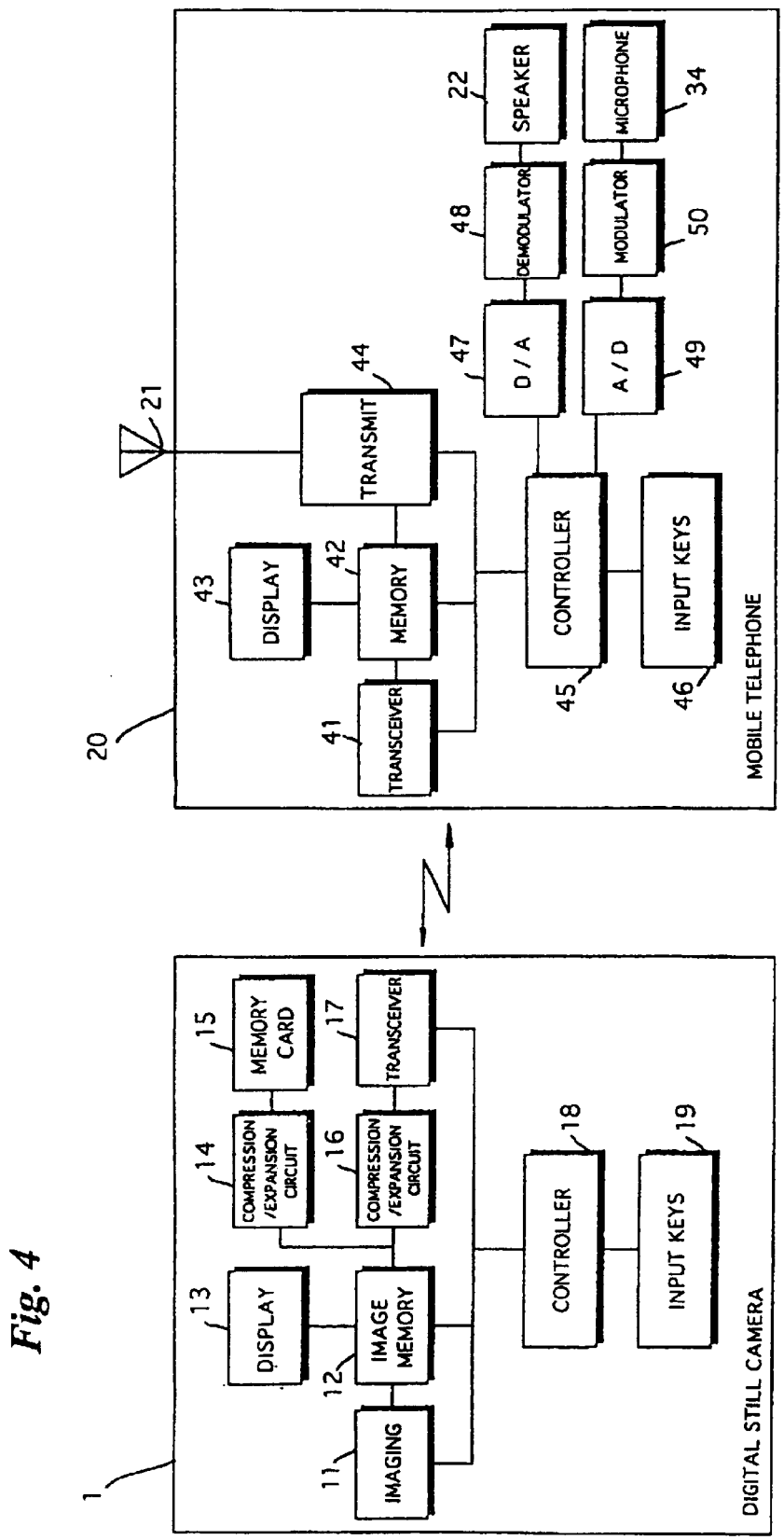
FIG. 4 is a block diagram showing the electrical construction of the digital still camera and mobile telephone according to this embodiment.

A microphone 34 for entering voice is provided on the front side of the mobile telephone 20 near the FIG. 4 is a block diagram showing the electrical construction of the digital still camera 1 and mobile telephone 20.

The overall operation of the digital still camera 1 is controlled by a controller 18.

Signals from the power switch 8, mode setting dial 4, up, down, left, right button 5 and shutter-release button 2 are input to the controller 18. (The power switch 8, mode setting dial 4, up, down, left, right button 5 and shutter-release button 2 are illustrated as an input-key unit 19 in FIG. 4.)

An imaging circuit 11 includes an image sensing device for imaging a subject, a signal processing circuit for applying a gamma correction and a white balance adjustment to a video signal output from the image sensing device, and an analog/digital conversion circuit for converting the analog signal to digital image data, etc.

In the imaging mode, image data output from the imaging circuit 11 is applied to a display unit 13 through an image memory 12. The image of the subject is displayed on display screen 9 of the display unit 13.

If the shutter-release button 2 is pressed, image data that has been output from the imaging circuit 11 is stored in the image memory 12 temporarily. The image data is read out of the image memory 12 and applied to a compression/expansion circuit 14, where the data is compressed. The compressed image data is applied to and recorded on a memory card 15.

In the playback mode, compressed image data that has been recorded on the memory card 15 is read out and applied to the compression/expansion circuit 14. The compressed image data is expanded in the compression/expansion circuit 14. The expanded image data is applied to the display unit 13 via the image memory 12 so that the image represented by the compressed image data is displayed on the display screen 9.

The digital still camera 1 according to this embodiment is capable of data communication with the mobile telephone 20.

When image data is transmitted to the mobile telephone 20, the image data to be transmitted is read out of the memory card 15 and the read image data is stored in the image memory 12 temporarily. The image data is compressed in a compression/expansion circuit 16 and then input to a transceiver circuit 17. The compressed image data is transmitted from the transceiver circuit 17 to the mobile telephone 20.

When image data transmitted from the mobile telephone 20 is received by the digital still camera 1, the standby mode is set by the mode setting dial 4. Compressed image data that has been transmitted from the mobile telephone 20 is received by the transceiver circuit 17 and the received compressed image data is then expanded by the compression/expansion circuit 16. The expanded image data is input to and stored temporarily in the image memory 12. The image data is read out of the image memory 12 and applied to the display unit 13, which proceeds to display the image represented by the received image data. The image data is applied also to the compression/expansion circuit 14, where the image data is compressed. The compressed image data is applied to and recorded on the memory card 15.

The mobile telephone 20 is capable of sending and receiving voice, text data and image data.

The overall operation of the mobile telephone 20 is controlled by a controller 45.

Signals from the various buttons 26, 27, 28, 30, 31, 32, 33 of the mobile telephone 20 are input into to the controller 45. (The various buttons 26, 27, 28, 30, 31, 32, 33 are illustrated as an input-key unit 46 in FIG. 4.)

Voice input to the microphone 34 is output as a voice signal, which is applied to a modulation circuit 50. The voice signal is modulated by the modulation circuit 50 and converted to digital voice data by an analog/digital conversion circuit 49. The digital voice data is applied to the antenna 21 via the controller 45 and a transmission circuit 44 and is transmitted to the network by the antenna 21. The voice data is transmitted to another communication apparatus, e.g., a mobile telephone, via the network.

Voice data that has been transmitted to the mobile telephone 20 via the network is received by the antenna 21 and input to the transmission circuit 44. The voice data is input to a digital/analog conversion circuit 47 via the controller 45, whereby the data is converted to an analog voice signal. The analog voice signal is applied to a demodulation circuit 48 and demodulated. The demodulated voice signal is applied to the speaker 22, whence voice is produced as an output.

Image data that has been transmitted from the digital still camera 1 is received by a transceiver circuit 41. The image data is applied to a memory 42 and is output from the memory 42 while storage and read-out are repeated. (One frame of image data may of course be stored in the memory 42 at one time.) The image data that has been output from the memory 42 is applied to the antenna 21 via the transmission circuit 44 and is transmitted from the antenna 21.

Data that has been received via the network (data other than voice data, e.g., image data and text data, etc.) is received by the antenna 21 and input to the memory 42 via the transmission circuit 44. Text data is applied to a display unit 43 having the liquid crystal display screen 23 on which the text represented by this text data is displayed (see FIG. 3). Image data is transmitted to the digital still camera 1 from the transceiver circuit 41. The image data is received by the digital still camera 1 in the manner described above and the image represented by this received image data is displayed on the display screen of the display unit 13 (see FIG. 2).

It goes without saying that the mobile telephone 20 has a MIME (Multipurpose Internet Mail Extensions) capability.

Figure 5:
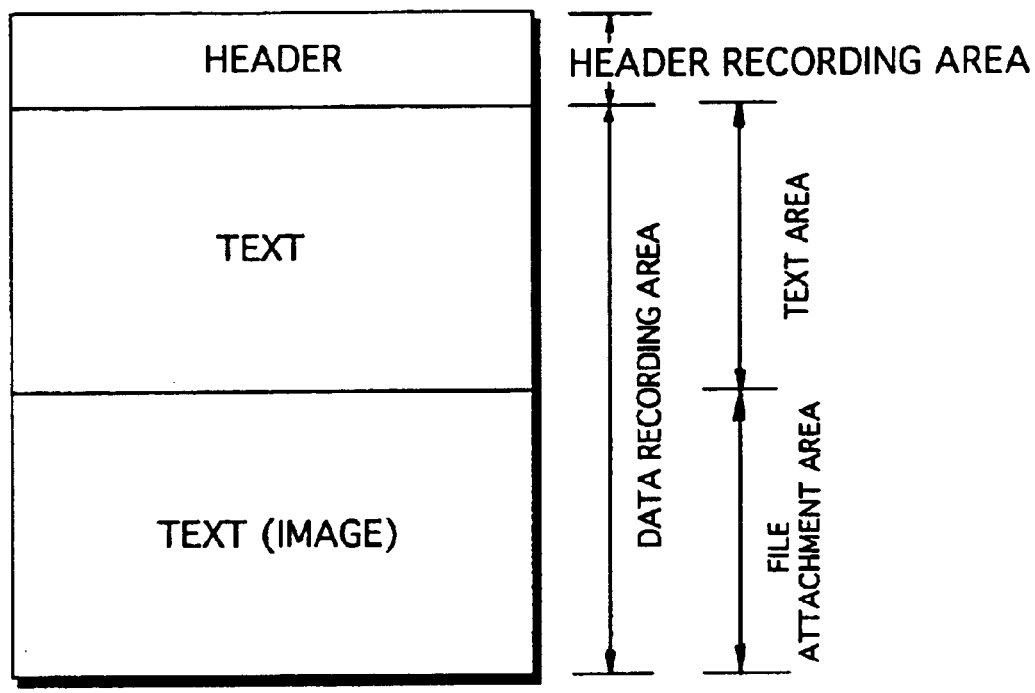
FIG. 5 illustrates the file structure of an electronic-mail file having an attached image file according to this embodiment.

FIG. 5 illustrates the file structure (data structure) of an E-mail file with an attached image file.

The E-mail file with the attached image file includes a header recording area and a data recording area.

Header information for managing data that has been recorded in the data recording area is recorded in the header recording area.

The data recording area includes a text area and a file attachment area. Though the text area and file attachment area are not explicitly formed in the data recording area, here it is assumed for the sake of convenience that the text area and file attachment area have been formed in the data recording area.

Text data representing text has been recorded in the text area. Data representing an image has been recorded in the form of text data in the file attachment area. (The data that has been recorded in the file attachment area shall be referred to as image data.)

Figure 6:
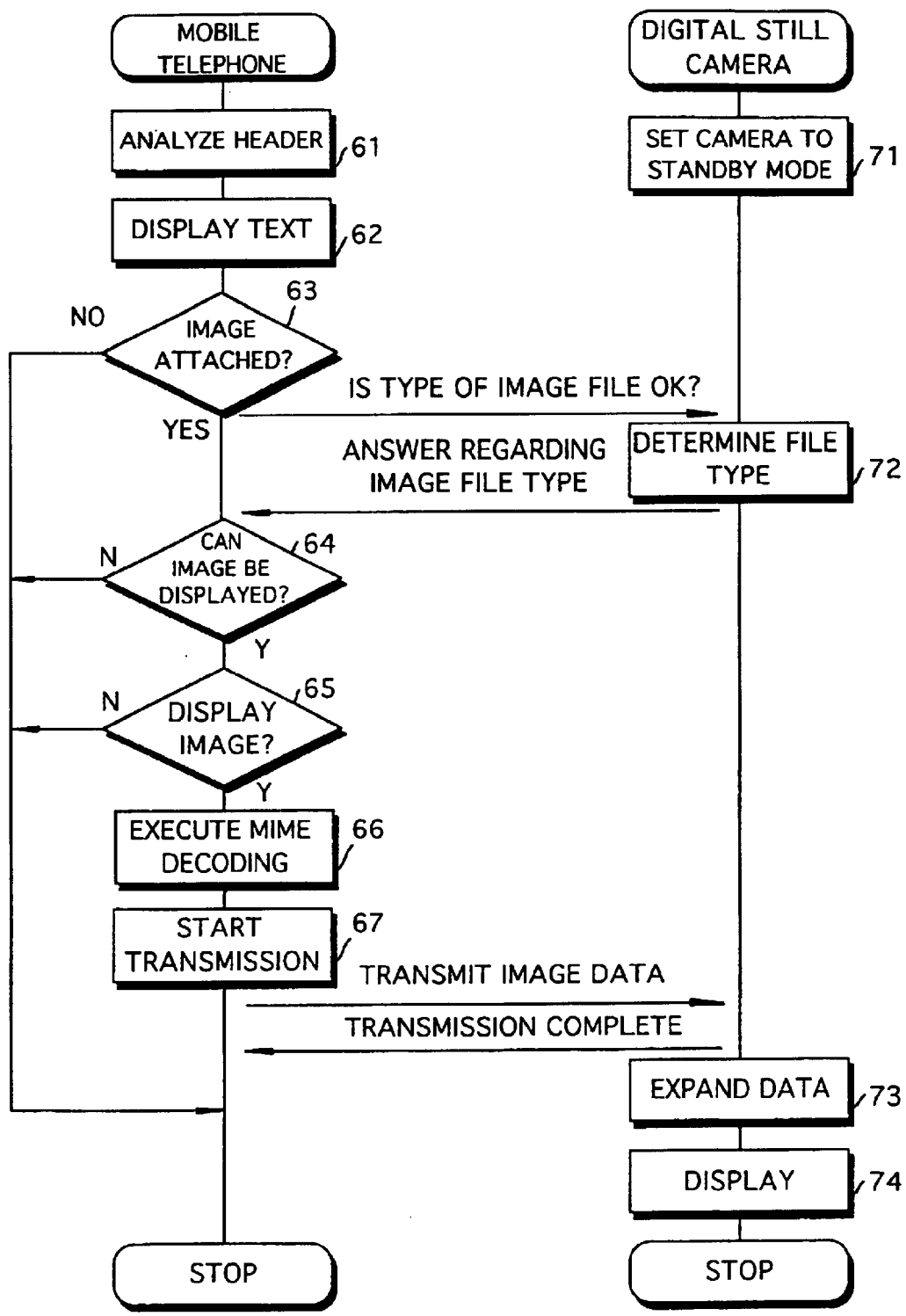
FIG. 6 is a flowchart illustrating processing at reception of an electronic-mail file having an attached image file according to this embodiment.

FIG. 6 is a flowchart illustrating processing executed by the mobile telephone 20 and digital still camera 1 when an E-mail file with an attached image file has been transmitted from the network.

The digital still camera 1 is set to the standby mode by the mode setting dial 4 of the digital still camera 1 at step 71.

The E-mail file with the attached image file is transmitted via the network and is received by the antenna 21 of the mobile telephone 20. The file received by the mobile telephone 20 is input to the controller 45 and the header information that has been recorded in the header recording area of this file is analyzed (step 61). Text data that has been recorded in the data recording area is extracted based upon the analyzed header information and is applied to the display unit 43. The text represented by this text data is displayed in the area 24 of the display screen 23 of the display unit 43 (step 62). The text can be displayed by the mobile telephone 20 because the mobile telephone has a memory (not shown) in which the software and font data for displaying text have been stored.

If an attached image file exists (i.e., if image data has been recorded in the file attachment area) ("YES" at step 63), data representing the image file type [JPEG (Joint Photographic Experts Group), GIF (Graphics Interchange Format), etc.] is transmitted from the mobile telephone 20 to the digital still camera 1 in order to check the image file type.

When type data is received by the digital still camera 1, it is determined whether the image represented by this image file can be displayed on the display unit 13 of the digital still camera 1 (step 72). It is determined that display is possible if software for displaying the image represented by the image file has been stored in a memory (not shown) of the digital still camera 1. Data indicative of the determination rendered is transmitted from the digital still camera 1 to the mobile telephone 20 as answer data.

On the basis of the received result of the determination in the digital still camera 1, it is determined whether the image represented by the image file can be displayed on the display unit 13 of the digital still camera 1 (step 64). If display is possible, an indication to this effect is displayed on the display screen of the display unit 13. The image file of the image to be displayed on the display unit 13 of the digital still camera 1 is selected using the buttons 26, 27 and 28 in the manner described earlier. In response to depression of the ENTER button 27 ("YES" at step 65) (entry of transmit command), MIME decoding processing is executed in the mobile telephone 20 (step 66).

The received image file (image data) is expanded by the compression/expansion circuit 16 in digital still camera 1 (step 73). The expanded image data is applied to the display unit 13 so that the image represented by this image data is displayed on the display screen 9 of display unit 13 (step 74).

Thus, text is displayed on the display unit 43 of mobile telephone 20 and an image is displayed on the display unit 13 of digital still camera 1.

Figure 7:
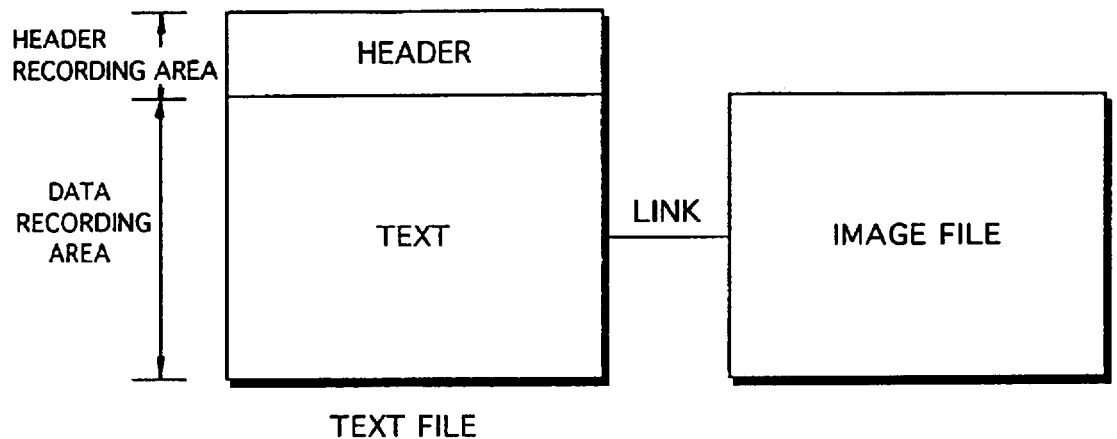
FIG. 7 illustrates the file structure of a Web-page file having an image according to this embodiment.

FIG. 7 illustrates a web-page file accompanied by an image.

The Web-page file with the image is obtained by accessing a Web page via the Internet and transmitting a download command to the server 100.

The web-page file with the image is composed of a text file and an image file (this text file is downloaded from the server 100 first). Image data representing the image has been recorded in the image file.

The text file includes a header recording area and a data recording area. Header information for managing data that has been recorded in the data recording area is recorded in the header recording area. Text data representing text is recorded in the data recording area. The text data is recorded in accordance with the HTML (HyperText Markup Language) format, by way of example. The text data includes also data for linking text and image files.

Figure 8:
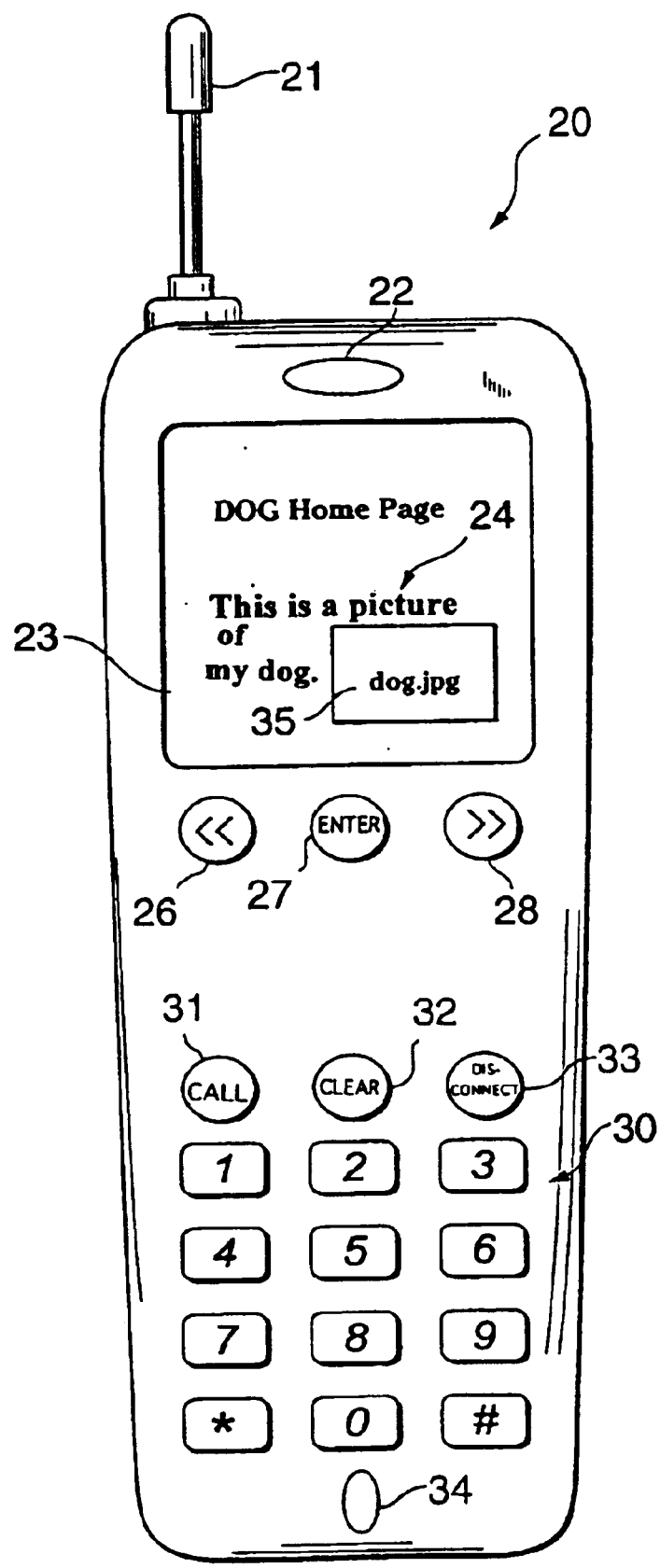
FIG. 8 is a front view of the mobile telephone.

FIG. 8 illustrates the display screen of the mobile telephone 20 when the mobile telephone 20 has received a web-page file accompanied by an image.

Components in FIG. 8 identical with those shown in FIG. 3 are designated by like reference characters and need not be described again.

Text represented by text data that has been recorded in a text file is displayed in the area 24. The file name of the image file linked to the text file is displayed in the area 35.

Figure 9:
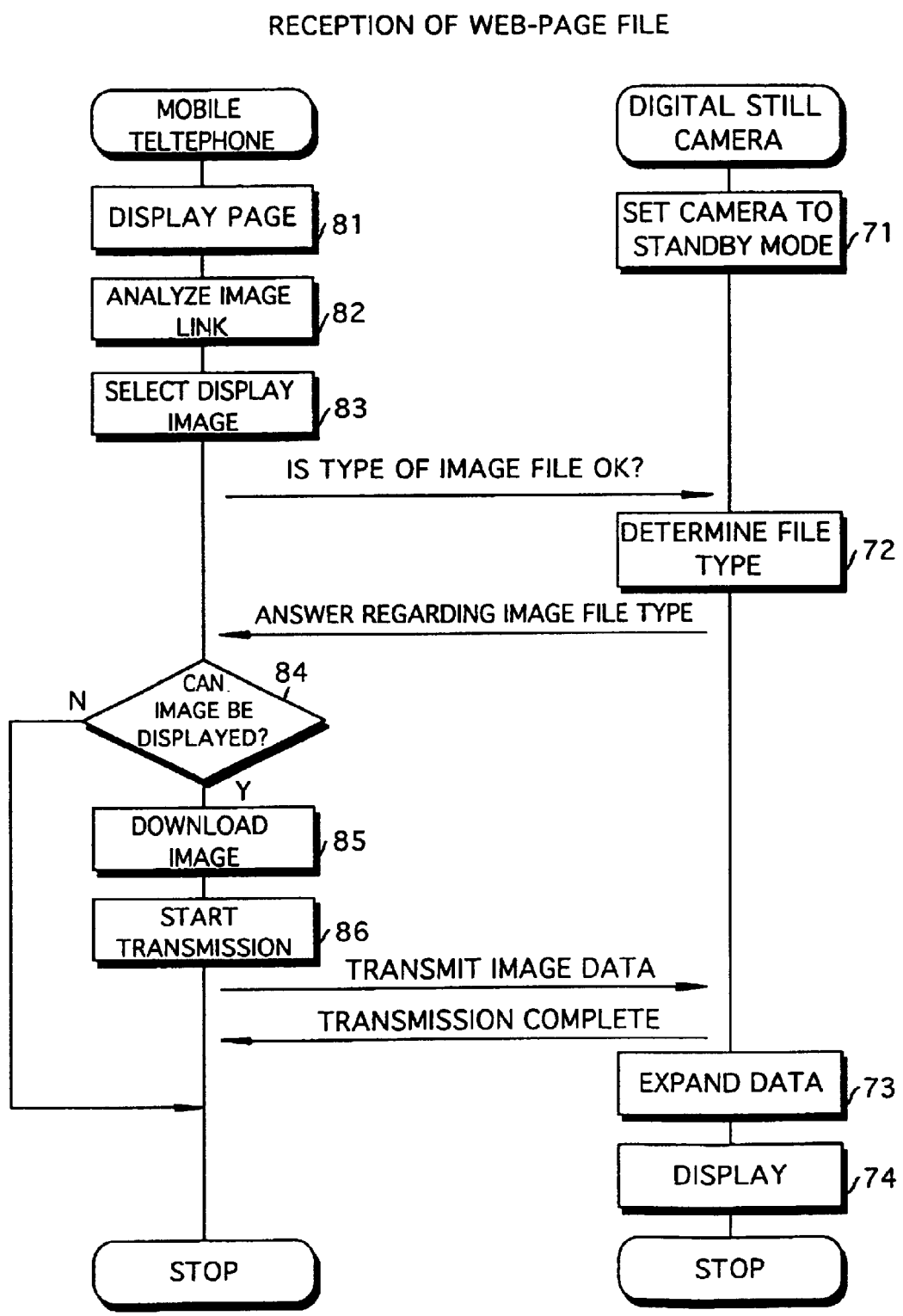
FIG. 9 is a flowchart illustrating processing at reception of a Web-page file having an image according to this embodiment.

FIG. 9 is a flowchart of processing executed by the mobile telephone 20 and digital still camera 1 when the transceiving system 90 receives a Web-page file accompanied by an image.

Processing steps in FIG. 9 identical with those shown in FIG. 6 are designated by like step numbers and need not be described again.

If the mobile telephone 20 receives a text file contained in a web-page file accompanied by an image, text is displayed on the liquid crystal display screen 23 of the mobile telephone 20 in accordance with text data that has been recorded in the text file (step 81) (display a page).

Link data that has been recorded in the text file is analyzed and the corresponding image file is found (step 82). In a case where a plurality of image files have been found, the image file to be displayed on the display unit 13 of the digital still camera 1 is selected from these image files by using the buttons 26, 27 and 28 as described earlier (step 83). If there is just one image file, then the processing of step 83 is skipped.

It is determined between the mobile telephone 20 and the digital still camera 1 in the manner described earlier whether the image represented by the selected image file can be displayed on the display unit 13 of the digital still camera 1 (step 72).

If image display is possible, image files representing the image are downloaded from the server 100 and are received by the mobile telephone 20 (step 85). The downloaded image files are transmitted successively from the mobile telephone 20 to the digital still camera 1 (step 85).

An image represented by an image file is displayed on the display unit of the digital still camera 1 in the manner shown in FIG. 2.

Thus, even in the case of a Web page accompanied by an image, the text can be displayed on the liquid crystal display screen 23 of the mobile telephone 20 and the image can be displayed on the display screen 9 of the digital still camera 1.

As many apparently widely different embodiments of the present invention can be made without departing from the spirit and scope thereof, it is to be understood that the invention is not limited to the specific embodiments thereof except as defined in the appended claims.

What is claimed is:

1. A data communication system in which a digital camera and a portable communication apparatus are capable of communicating data with each other, a housing of said digital camera is separate from a housing of said portable communication apparatus and said portable communication apparatus is capable of communicating with another communication apparatus via a network, wherein said portable communication apparatus includes:

a first receiving unit for receiving data transmitted via the network;

a text display unit for displaying text represented by text data contained in the data received by said first receiving unit;

a first determination unit for determining whether the data received by said first receiving unit contains image data representing an image; and an image transmitting unit, which is responsive to a determination that the received data contains the image data, for transmitting the image data contained in the received data to said digital camera; and said digital camera includes:

a second receiving unit for receiving the image data transmitted from said image transmitting unit of said portable. communication apparatus; and an image display unit for displaying the image represented by the image data received by said second receiving unit.

2. The system according to claim 1, wherein said portable communication apparatus further includes a type-data transmitting unit for transmitting a type data, which represents a type of image, to said digital camera; and said digital camera further includes a second determination unit for determining whether the image represented by the image data can be displayed on said image display unit based upon the type data transmitted from said portable communication apparatus.

3. The system according to claim 2, wherein said digital camera further includes a determination-result transmitting unit for transmitting determination-result data representing a result of the determination by said second determination unit to said portable communication apparatus; and said image transmitting unit of said portable communication apparatus responds to the determination-result data transmitted from said determination-result transmitting unit to the effect that the image represented by the image data can be displayed on said image display unit by transmitting the image data to said digital camera.

4. The system according to claim 1, wherein said portable communication apparatus further includes a transmit-command input unit for inputting an image-transmit command; and said image transmitting unit transmits the image data to said digital camera in response to input of the transmit command from said transmit-command input unit.

5. A portable communication apparatus capable of communicating data with a digital camera and of communicating with another communication apparatus via a network, and a housing of said portable communication apparatus is separate from a housing of said digital camera, comprising:

a receiving unit for receiving data transmitted via the network;

a text display unit for displaying text represented by text data contained in the data received by said receiving unit;

a determination unit for determining whether the data received by said receiving unit contains image data representing an image; and an image transmitting unit, which is responsive to a determination that the received data contains the image data, for transmitting the image data contained in the received data to said digital camera.

6. A digital camera capable of communicating data with a portable communication apparatus that is capable of communicating with another communication apparatus via a network, and a housing of said digital camera separate from a housing of said portable communication apparatus, wherein image data representing an image that has been extracted from data received by said portable communication apparatus is transmitted from said portable communication apparatus to said digital camera, said digital camera comprising:

a receiving unit for receiving the image data transmitted from said portable communication apparatus; and an image display unit for displaying the image represented by image data received by said receiving unit.

7. A method of controlling operation of a portable communication apparatus capable of communicating data with a digital camera and of communicating with another communication apparatus via a network, and a housing of said portable communication apparatus is separate from a housing of said digital camera comprising the steps of:

receiving data transmitted via the network;

displaying text, which is represented by text data contained in the received data, on a text display unit;

determining whether the received data contains image data representing an image; and in response to a determination that the received data contains the image data, transmitting the image data contained in the received data to the digital camera.

* * * * *